United States Patent [19]
Kuan

[11] Patent Number: 5,738,247
[45] Date of Patent: Apr. 14, 1998

[54] AUTOMATIC LIQUID MATERIAL METERING SYSTEM

[76] Inventor: Ching Fu Kuan, No. 12, Alley 18, Lane 136, Er Jiu Rd., Ta Pu Lee, San Hsia, Taipei Hsien, Taiwan

[21] Appl. No.: 719,654

[22] Filed: Sep. 25, 1996

[51] Int. Cl.⁶ .................................................. G01G 13/00
[52] U.S. Cl. ........................... 222/77; 222/144; 222/399; 222/504
[58] Field of Search .......................... 222/77, 144, 167, 222/399, 504

[56] References Cited

U.S. PATENT DOCUMENTS

| | | | |
|---|---|---|---|
| 3,848,775 | 11/1974 | Possell | 222/504 |
| 4,011,969 | 3/1977 | Martin | 222/504 |
| 4,762,252 | 8/1988 | Hyer et al. | 222/77 |
| 5,356,041 | 10/1994 | Hellenberg et al. | 222/144 |
| 5,405,050 | 4/1995 | Walsh | 222/504 |
| 5,435,189 | 7/1995 | Gmuer et al. | 222/77 |
| 5,558,251 | 9/1996 | Neri | 222/144 |
| 5,680,964 | 10/1997 | Wardle | 222/504 |

*Primary Examiner*—Joseph Kaufman
*Attorney, Agent, or Firm*—Bacon & Thomas

[57] ABSTRACT

An automatic liquid material metering system including a plurality of storage tanks mounted around the periphery of a rotary wheel, each storage tank having a valve port and an electromagnetic valve controlled by a control switch to close open the valve port, a pulley block system having a carriage, a lifting rack at one side of the carriage, and a horizontal slide at the top of the lifting rack, and a contact switch mounted on the horizontal slide and moved to switch on/off the control switch, an electronic scale mounted on the carriage, a receptacle mounted on the electronic scale and adapted for holding a liquid material discharged from one of the storage tanks, permitting the received liquid material to be measured by the electronic scale, and a microprocessor adapted for receiving signal from the electronic scale and input data from an input device so as to control the rotation of the rotary wheel, and the movement of the pulley block system subject to the signal and data received.

13 Claims, 7 Drawing Sheets

5,738,247

AUTOMATIC LIQUID MATERIAL METERING SYSTEM

BACKGROUND OF THE INVENTION

Automatic liquid material metering systems are commonly used in chemical industry, textile dying industry, and food industry for measuring the volume of a liquid. An accurate control of the volume of liquid materials in the production of a product has greatly concern with the quality of the product to be manufactured. FIG. 1 shows an automatic liquid material metering system according to the prior art. This system comprises a plurality of storage tanks 10. Each storage tank 10 has a magnetic stirring element 101 on the inside at the bottom. A magnetic plate 103 is disposed below each storage tank 10, and turned by a motor 102. When the motor 102 is started, the magnetic plate 103 is turned on an axis, thereby causing the magnetic stirring element 101 to stir the liquid in the respective storage tank 10. Each storage tank 10 further has a supply pipe 104 at the top installed with a control valve 105. Through the supply pipe 104 and by means of a siphon the liquid is drawn out of the respective storage tank 10 to a container 107 on an electronic scale 106, and measured. When the desired volume of the liquid is supplied to the container 107, the weight signal of the electronic scale 106 is sent to the control circuit of a microprocessor 108, causing it to shut off the control valve 105. A big scale automatic liquid volume metering system may comprise a big number of storage tanks and supply pipes. However, an automatic liquid material metering system of the aforesaid design is suitable for use in measuring a liquid of low viscosity. Another drawback of this design of automatic liquid material metering system is that the residual liquid in each supply pipe cannot flow back to the respective storage tank, and will be retained in the respective supply pipe, causing a deposit. Therefore, a measuring error tends to occur after long uses of the metering system. This deposit problem becomes more serious when the storage tank is used to hold a liquid of high viscosity.

SUMMARY OF THE INVENTION

The present invention has been accomplished to provide an automatic liquid material metering system which eliminates the aforesaid problems. According to one aspect of the present invention, the automatic liquid material metering system comprises a plurality of storage tanks mounted around the periphery of a rotary wheel, each storage tank having a valve port and an electromagnetic valve controlled by a control switch to close open the valve port, a pulley block system having a carriage, a lifting rack at one side of the carriage, and a horizontal slide at the top of the lifting rack, and a contact switch mounted on the horizontal slide and moved to switch on/off the control switch, an electronic scale mounted on the carriage, a receptacle mounted on the electronic scale and adapted for holding a liquid material discharged from one of the storage tanks, permitting the received liquid material to be measured by the electronic scale, and a microprocessor adapted for receiving signal from the electronic scale and input data from an input device so as to control the rotation of the rotary wheel and the movement of the pulley block subject to the signal and data received. According to another aspect of the present invention, the a high pressure supply system is installed and controlled by the microprocessor to provide a high pressure gas to the storage tanks, so as to increase the inside pressure of the storage tanks.

DETAILED DESCRIPTION OF THE PREFERRED EMBODIMENT

Figure 1:
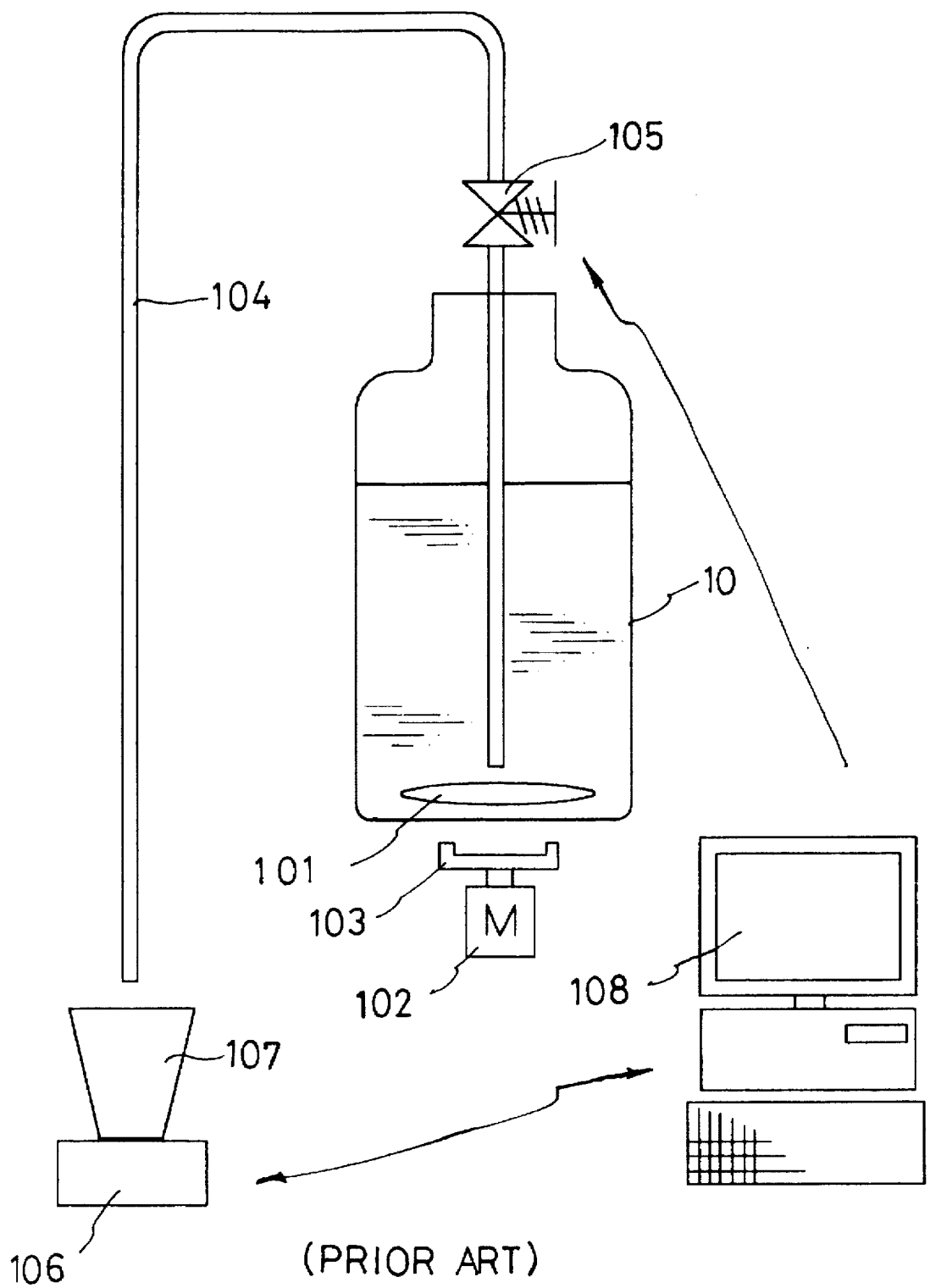
FIG. 1 shows the arrangement of an automatic liquid material metering system according to the prior art.
Figure 2:
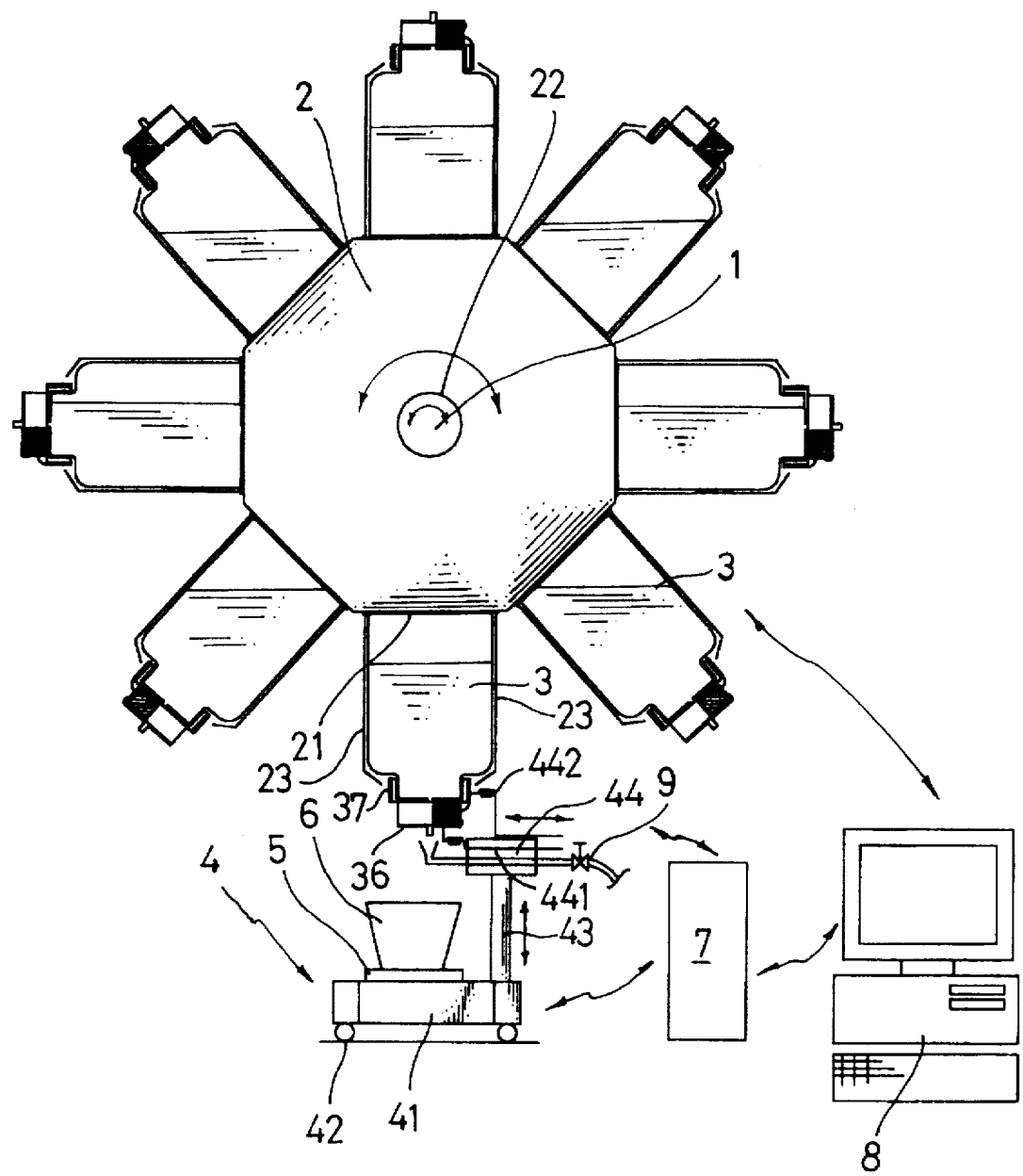
FIG. 2 shows the arrangement of an automatic liquid material metering system according to the present invention.
Figure 3:
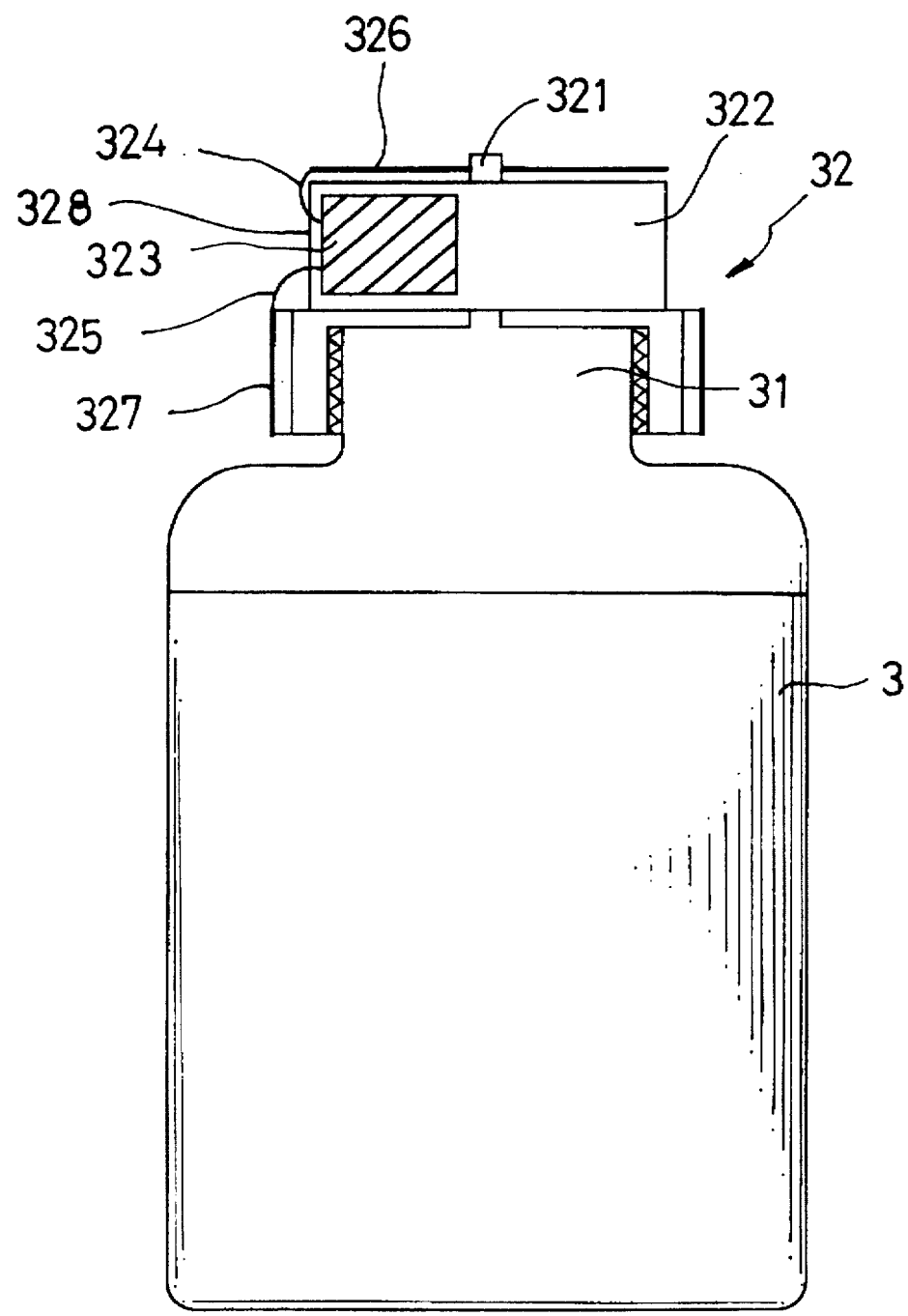
FIG. 3 is a sectional view of a storage tank according to the present invention.

Referring to FIG. 2, an automatic liquid material metering system is generally comprised of a main shaft 1, a rotary wheel 2, a plurality of storage tanks 3, a pulley block system 4, an electronic scale 5, a container 6, a control interface 7, and a microprocessor 8.

Referring to FIGS. from 2 to 5, the main shaft 1 is disposed in a horizontal position, and driven by a power drive to rotate clockwise or counter-clockwise. The rotary wheel 2 is a polygonal table mounted around the main shaft 1 and turned with it, having a center hole 22, which receives the main shaft 1, and pairs of hooks 23 respectively and radially raised from the peripheral sides 21 thereof. Each pair of hooks 23 hold one storage tank 3 at one peripheral side 21. The storage tanks 3 are cylindrical drums adapted for holding any of a variety of liquids, and respectively mounted at the peripheral sides 21 of the rotary wheel 2. Each storage tank 3 has a neck 31, and a dispensing control device 32 detachably fastened to the neck 31. The dispensing control device 32 comprises an insulative shell 328 having a valve port 321 disposed in communication with the neck 31 of the storage tank 3 through which a liquid can be drawn out of the storage tank 3 or a compressed air can be driven into the storage tank 3, an electromagnetic valve 322 mounted inside the insulative shell 328, a plate electrode 326 disposed adjacent to the valve port 321 and connected to one lead wire 324 of the winding 323 of the electromagnetic valve 322, and a ring electrode 327 disposed outside the insulative shell 328 and connected to an opposite lead wire 325 of the winding 323 of the electromagnetic valve 322. The pulley block system 4 comprises a track 42 transversely disposed in parallel to the main shaft 1, a carriage 41 moved along the track 42, a lifting rack 43 mounted on the carriage 41 at one side and controlled by the control interface 7 through a hydraulic or pneumatic drive to move up and down, and a horizontal slide 44 mounted on the lifting rack 43 at the top and moved horizontally. The horizontal slide 44 comprises a first electrode 441 and a second electrode 442 adapted for contacting the plate electrode 326 and ring electrode 327 of the dispensing control device 32 of each storage tank 3 respectively. When the first electrode 441 and second electrode 442 of the horizontal slide 44 are moved into contact with the plate electrode 326 and ring electrode 327 of the dispensing control device 32, the electromagnetic valve 322 of the respective dispensing control device 32 is turned on to open the valve port 321. On the contrary, when the first electrode 441 and the second electrode 442 are moved with the horizontal slide 44 away from the plate electrode 326 and ring electrode 327 of the dispensing control device 32, the electromagnetic valve 322 of the respective dispensing control device 32 is off, and the valve port 321 is closed. The first electrode 441 and the second electrode 442 are respectively made from springy metal of high electrical conductivity.

Figure 6:
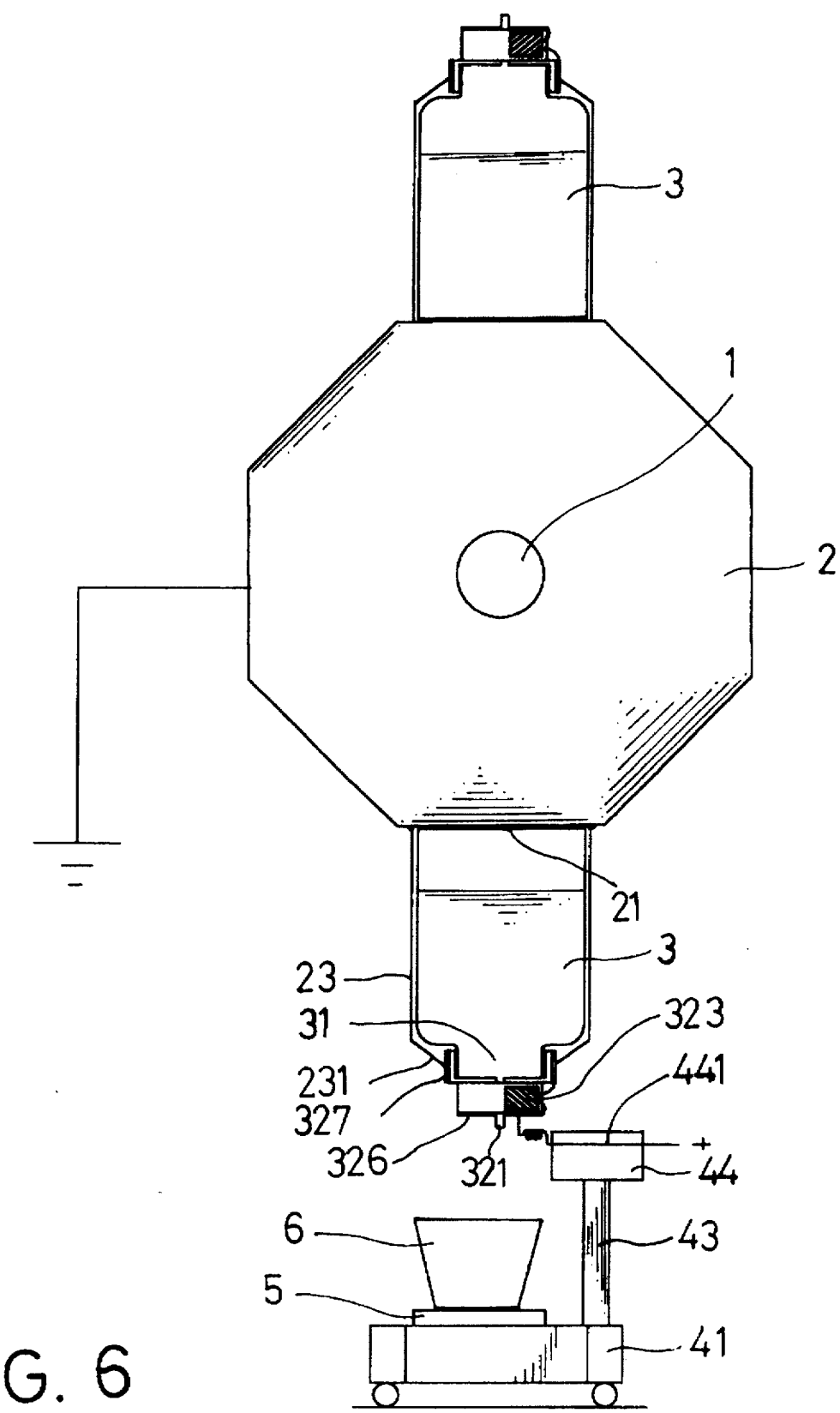
FIG. 6 shows an alternate form of the present invention.

FIG. 6 shows an alternate form of the present invention, in which each pair of hooks 23 of the rotary wheel 2 are made from metal of high electrical conductivity, the hooked ends 231 of the hooks 23 are constantly maintained in contact with the ring electrode 327 of the dispensing control device 323 of the corresponding storage tank 3 to form a grounding terminal, and the aforesaid second electrode 442 of the horizontal slide 44 is omitted. When the first electrode 441 of the horizontal slide 44 is moved into contact with the plate electrode 326, the valve port 321 is opened.

Referring to FIGS. 4 and 5 again, because the dispensing control device 32 of each storage tank 3 has only one valve port 321, the liquid cannot be smoothly discharged out of the respective storage tank 3 when the ambient atmospheric pressure surpasses the inside pressure of the respective storage tank 3 or the viscosity of the liquid is high. In order to eliminate this problem, a high pressure air supply system 9 is installed. The high pressure air supply system 9 comprises a high pressure air pipe 91 inserted through the horizontal slide 44. The high pressure air pipe 91 has a hopper-like coupling 92 at one end adapted for connection to the valve port 321, and a control valve 93 at an opposite end connected to a high pressure air source, which provides air or inert gas that does not react with the liquid in the corresponding storage tank 3.

Figure 7:
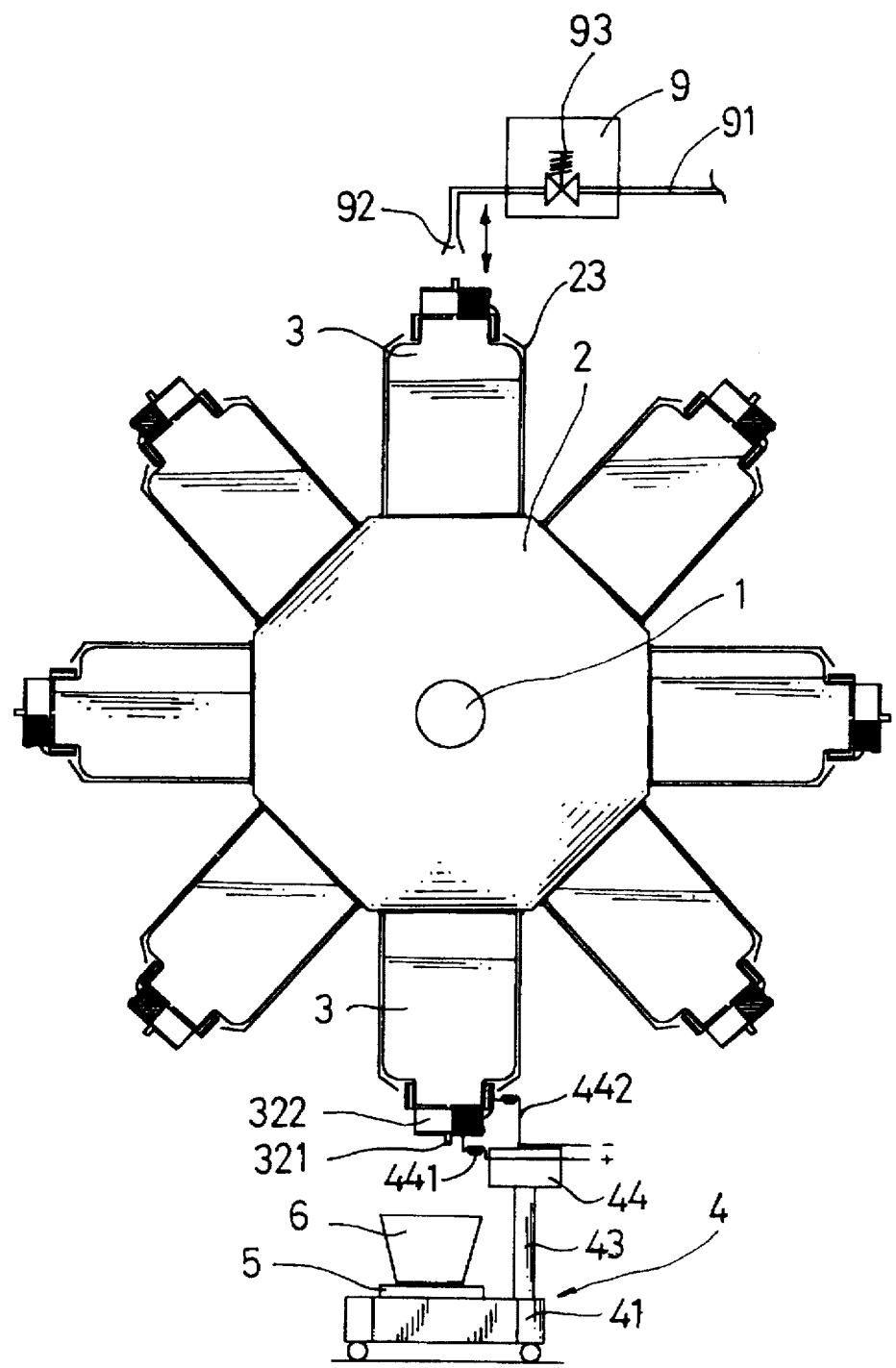
FIG. 7 shows another arrangement of the high pressure air supply system according to the present invention.

Referring to FIG. 7, the high pressure air supply system 9 may be installed at an elevation above the rotary wheel 2, and can be moved horizontally as well as vertically to attach the hopper-like coupling 92 to the valve port 321 of the dispensing control device 32 of the storage tank 3 which is moved to the top side. When one storage tank 3 is filled with compressed air, the valve port 321 of the respective dispensing control device 32 is closed, and the valve port 321 is opened again when the respective storage tank 3 is moved to the bottom side, permitting the liquid to be quickly discharged out of the respective storage tank 3 to the container 6 on the electronic scale 5.

Figure 4:
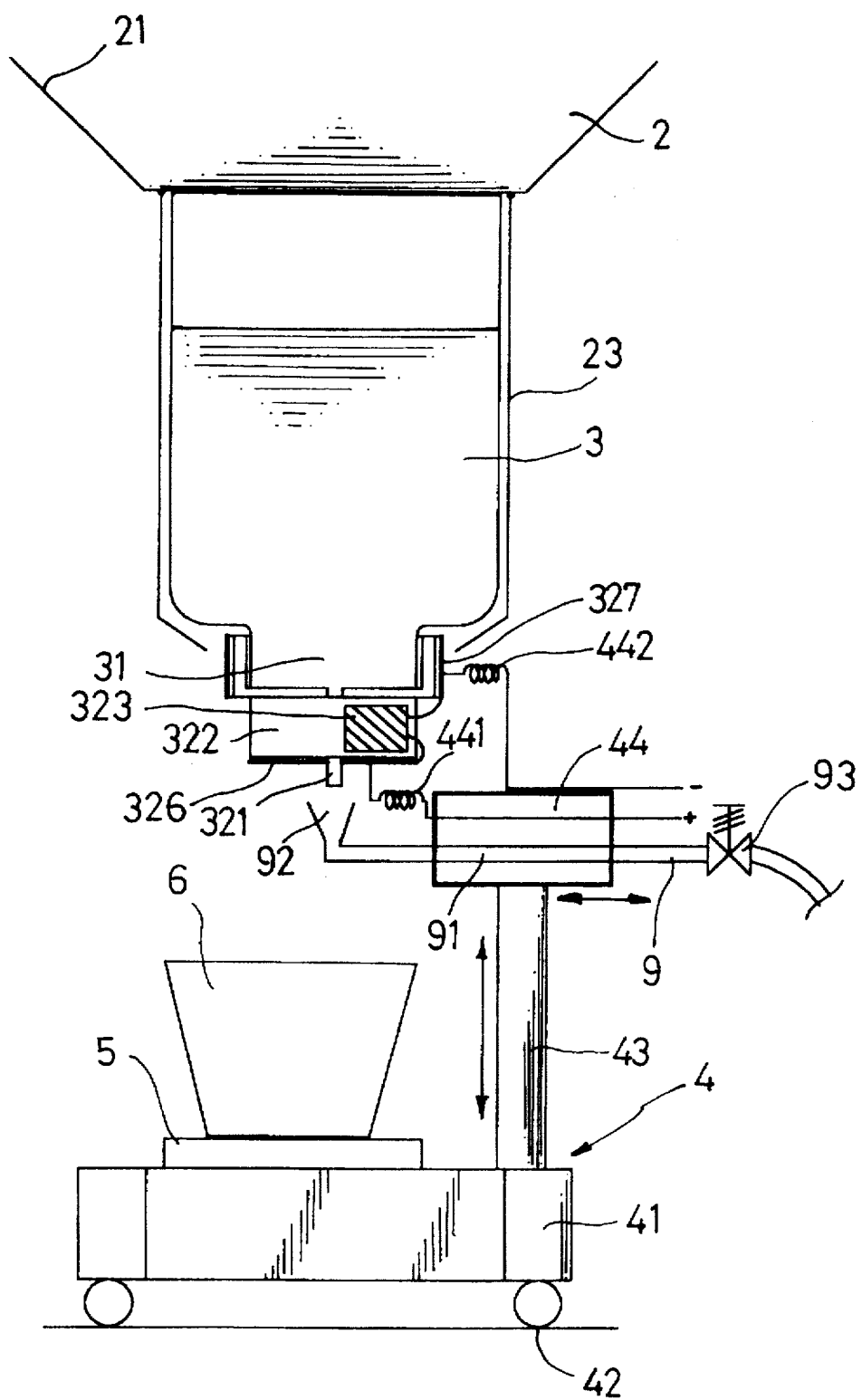
FIG. 4 is a partial view in an enlarged scale of the present invention.
Figure 5:
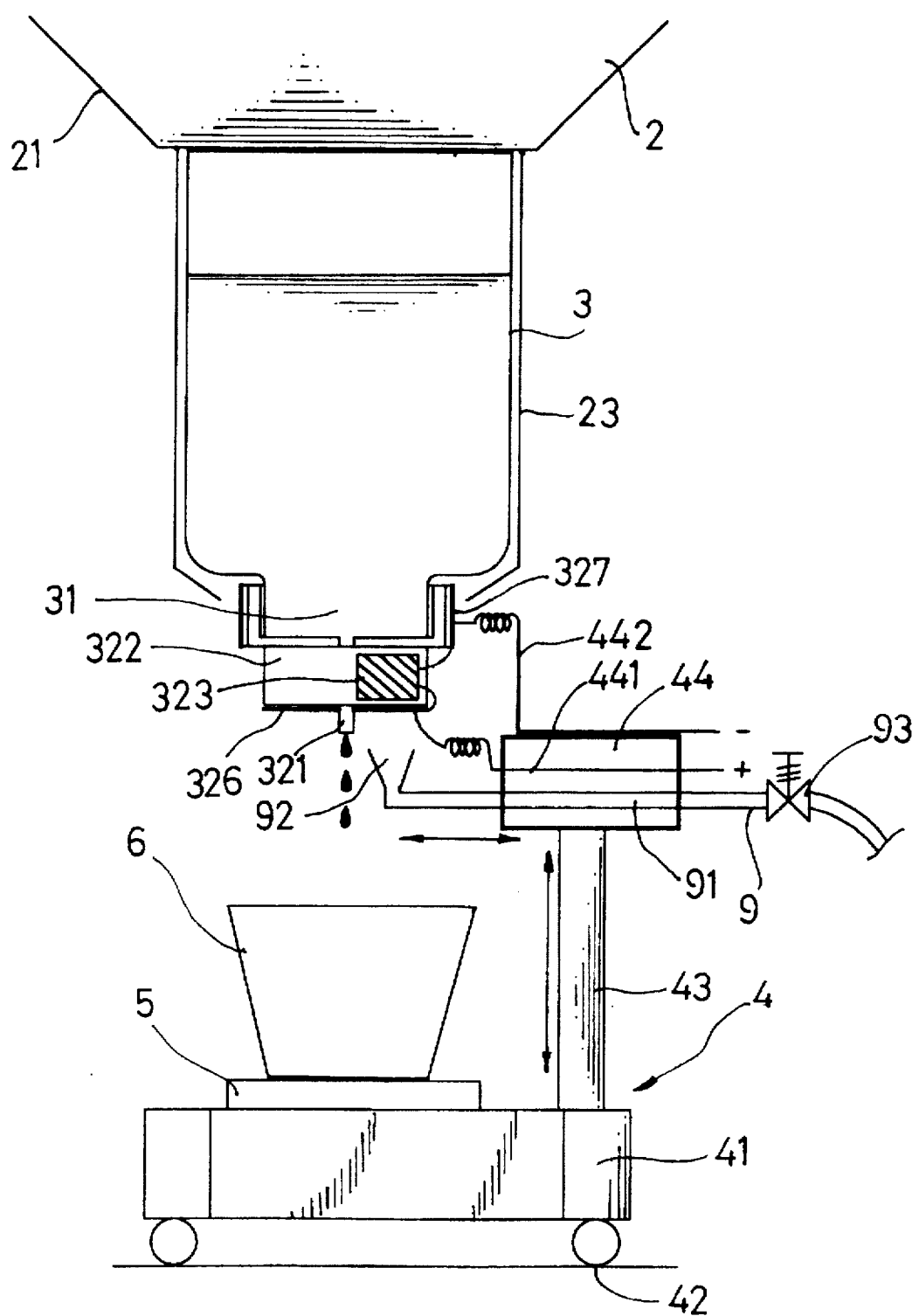
FIG. 5 is similar to FIG. 4 but showing a liquid discharged from the storage tank.

When to let a liquid to be discharged out of one storage container 3, please refer to FIGS. 4 and 7, the high pressure air pipe 91 of the high pressure air supply system 9 is moved horizontally and vertically to force the coupling 92 into engagement with the valve port 321, then the control valve 93 is opened to let compressed air be driven through the high pressure air pipe 91, the coupling 92 and the valve port 321, into the storage tank 3. When the inside pressure of the storage tank 3 surpasses the ambient atmospheric pressure, please see also FIG. 5, the high pressure air pipe 91 is moved back to its former position, and the liquid of the storage container 3 flows downwards toward the valve port 321, and at the same time the lifting rack 43 and the horizontal slide 44 are moved relatively to force the first electrode 441 and the second electrode 442 into contact with the plate electrode 326 and the ring electrode 327 respectively, thereby causing the valve port 321 to be opened for permitting the liquid to be discharged from the storage tank 3 to the container 6. As an alternate form of the present invention as shown in FIG. 6, the ring contact 327 is disposed in contact with the hooks 231, and the electrode 441 is forced into contact with the plate contact 326, causing the valve port 321 to be opened for permitting the liquid to be discharged from the storage tank 3 to the container 6.

The aforesaid electronic scale 5 is mounted on the carriage 41 to measure the weight of the liquid carried in the container 6. When the weight of the liquid in the container 6 reaches a predetermined value, the control interface 7 immediately provides a signal to the microprocessor 8, causing it to move the horizontal slide 44, and therefore the electrodes 421, 422 of the horizontal slide 44 are respectively disconnected from the plate electrode 326 and the ring electrode 327 to turn off the electromagnetic valve 322 and to close the valve port 321.

The aforesaid container 6 is a top-open receptacle carried on the electronic scale 5 for holding a liquid discharged from one storage tank 3.

The aforesaid control interface 7 receives signals from the pulley block system 4, the electronic scale 5 and the high pressure air supply system 9, and provides received signals to the microprocessor 8 for processing, so that the microprocessor 8 can control the movement of the pulley block system 4, the high pressure air supply system 9, the lifting rack 43 and the horizontal slide 44, the operation of the electromagnetic valve 322 of the dispensing control device 32 of each storage tank 3, the operation of the power drive which drives the main shaft 1, and the operation of the control valve 93 of the high pressure air supply system 9 subject to the input data and the signal of the electronic scale 5 through the control interface 7.

Referring to FIGS. 2 and 5 again, the main shaft 1 is fastened to the center hole 22 of each of at least one rotary wheel 2; each of the at least one rotary wheel 2 has at least three peripheral sides 21, and a storage tank 3 respectively secured at each peripheral side 21 by hooks 23. When not to supply liquid materials, the main shaft 1 is turned at a low revolving speed. When the main shaft 1 is turned, the storage tanks 3 are moved with the rotary wheels 2, causing respective liquid materials to be mixed in the respective storage tanks 3. When to supply liquid materials, the microprocessor 8 gives a command to the power drive through the control interface 7, causing it to turn the main shaft 1 clockwise or counter-clockwise subject to the detection of the position detector in the main shaft 1, so as to move the storage tank 3, which holds the selected material, into the discharging position at the bottom side. At the same time, the microprocessor 8 provides a signal to the pulley block system 4 through the control interface 7, causing the carriage 41 to be moved along the track 42 into position in vertical alignment with the discharging position of the selected storage tank 3, and the horizontal slide 44 to be moved into a position in which the first electrode 441 and second electrode 442 of the horizontal slide 44 are respectively forced into contact with the plate electrode 442 and ring electrode 327 of the dispensing control device 32 of the selected storage tank 3, causing the valve port 321 to be opened. When the valve port 321 is opened, the coupling 92 of the high pressure air pipe 91 of the high pressure air supply system 9 is moved into engagement with the valve port 321, for permitting high pressure air to be driven into the selected storage tank 3. When the inside pressure of the selected storage tank 3 surpasses the ambient atmospheric pressure, the high pressure air pipe 91 of the high pressure air supply system 9 is retracted to disengage the coupling 92 from the valve port 321, allowing the selected liquid material to flow out of the storage tank 3 through the valve port 321 to the container 6. When the weight of the liquid material in the container 6 reaches the set value, the electronic scale 5 immediately gives a signal to the microprocessor 8 through the control interface 7, causing the microprocessor 8 to give a common to stop the supply of the selected material.

It is to be understood that various modifications and changes could be made thereunto without departing from the spirit and scope of the invention disclosed.

What the invention claimed is:

1. An automatic liquid material metering system comprising:

a main shaft disposed in a horizontal position and turned clockwise and counter-clockwise by a power drive;

at least one rotary wheel mounted around said main shaft and turned with it, each of said at least one rotary wheel having a plurality of peripheral sides;

a plurality of storage tanks respectively fastened to the peripheral sides of said at least one rotary wheel and holding a respective liquid material, each of said storage tanks having a neck at an outer side remote from the respective peripheral side of the respective rotary wheel, and a dispensing control device detachably mounted on said neck by fastening means, said dispensing control device comprising a valve port disposed in communication with said neck, and a control switch unit controlled to close and open said valve port;

a pulley block system, said pulley block system comprising a track transversely disposed in parallel to said main shaft at a lower elevation, a carriage moved along said track, a lifting rack mounted on said carriage at one side and controlled to move up and down relative to said carriage, a horizontal slide mounted on said lifting rack and controlled to move horizontally relative to said lifting rack, and a contact switch installed in said horizontal slide, said contact switch being moved with said pulley block system relative to the control switch unit of the dispensing control device of one of said storage tanks which is moved to a vertical position, causing the control switch unit of the dispensing control device of the corresponding storage tank to open/close the respective valve port;

an electronic scale mounted on said carriage;

a receptacle mounted on said electronic scale and adapted for holding a liquid material discharged from one of said storage tanks, permitting the received liquid material to be measured by said electronic scale; and, a control interface and a microprocessor adapted for receiving signal from said electronic scale and input data from an input device so as to control the rotation of said main shaft, and the movement of said pulley block system subject to the signal and data received.

2. The automatic liquid material metering system of claim 1 wherein each peripheral side of each of said at least one rotary wheel comprises a set of hooks adapted for holding one storage tank.

3. The automatic liquid material metering system of claim 1 wherein the control switch unit of the dispensing control device of each of said storage tanks comprises an electromagnetic valve, a winding, and a control switch controlled by the contact switch of said pulley block system to energize/disenergize said winding, causing said electromagnetic valve to be driven to close/open the valve port of the corresponding dispensing control device.

4. The automatic liquid material metering system of claim 3 wherein said control switch is comprised of a plate electrode and a ring electrode insulated from each other and respectively connected to two opposite terminals of said winding; the contact switch of said pulley block system is comprised of a first electrode and a second electrode respectively mounted on said horizontal slide, and moved to contact the plate electrode and ring electrode of said control switch.

5. The automatic liquid material metering system of claim 1 wherein the lifting rack of said pulley block system is driven by a hydraulic driving system.

6. The automatic liquid material metering system of claim 1 wherein the lifting rack of said pulley block system is driven by a pneumatic driving system.

7. The automatic liquid material metering system of claim 1 wherein the horizontal slide of said pulley block system is driven by a hydraulic driving system.

8. The automatic liquid material metering system of claim 1 wherein the horizontal slide of said pulley block system is driven by a pneumatic driving system.

9. The automatic liquid material metering system of claim 2 wherein said hooks are respectively made from metal and maintained in contact with said control switch to form a negative loop.

10. The automatic liquid material metering system of claim 4 wherein the first electrode and second electrode of the contact switch of said pulley block system are respectively made from springy metal.

11. The automatic liquid material metering system of claim 1 further comprising a high pressure air supply system controlled to fill said storage tanks with a high pressure gas, said high pressure air supply system comprising a high pressure air pipe moved relative to said rotary wheel, said high pressure air pipe having a coupling at one end adapted for coupling to the valve port of the dispensing control device of one of said storage tanks, and a control valve at an opposite end connected to a high pressure air source, which provides a high pressure gas.

12. The automatic liquid material metering system of claim 11 wherein said high pressure gas is compressed air.

13. The automatic liquid material metering system of claim 11 wherein said high pressure gas is an inert gas.

* * * * *